(12) United States Patent
Parker et al.

(10) Patent No.: US 11,505,323 B1
(45) Date of Patent: Nov. 22, 2022

(54) CONNECTOR FOR A TUBE ASSEMBLY IN A PASSENGER SEAT

(71) Applicant: Safran Seats USA LLC, Gainesville, TX (US)

(72) Inventors: Charles Michael Parker, Irvine, CA (US); Reza Mansouri, Costa Mesa, CA (US); Romain Tranier, Costa Mesa, CA (US)

(73) Assignee: Safran Seats USA LLC, Gainesville, TX (US)

( * ) Notice: Subject to any disclaimer, the term of this patent is extended or adjusted under 35 U.S.C. 154(b) by 0 days.

(21) Appl. No.: 17/466,943

(22) Filed: Sep. 3, 2021

(51) Int. Cl.
*B64D 11/06* (2006.01)
*B60N 2/68* (2006.01)

(52) U.S. Cl.
CPC .......... *B64D 11/0648* (2014.12); *B60N 2/682* (2013.01)

(58) Field of Classification Search
CPC ............................ B64D 11/0648; B60N 2/682
See application file for complete search history.

(56) References Cited

U.S. PATENT DOCUMENTS

| | | | | |
|---|---|---|---|---|
| 2,991,830 | A * | 7/1961 | Abel ................. | B64D 11/0648 403/103 |
| 5,498,096 | A * | 3/1996 | Johnson ............... | F16L 13/161 29/515 |
| 6,352,307 | B1 * | 3/2002 | Engman ................ | A61G 5/125 297/452.4 |
| 11,192,479 | B1 * | 12/2021 | Brkovic ................. | B60N 2/36 |

FOREIGN PATENT DOCUMENTS

| | | | | |
|---|---|---|---|---|
| CN | 206031145 U | * | 3/2017 | ........... B21D 35/001 |
| DE | 102008038851 A1 | * | 2/2010 | ............... B60N 2/68 |
| DE | 202009013177 U1 | * | 3/2010 | ............ B60N 2/682 |
| DE | 102012218652 A1 | * | 4/2014 | ............ B60N 2/682 |
| DE | 102019212365 A1 | * | 2/2021 | |
| FR | 3088901 A1 | * | 5/2020 | ............. B21D 39/06 |
| GB | 2100790 A | * | 1/1983 | ............ B60N 2/2227 |
| WO | WO-2008091247 A1 | * | 7/2008 | ................ B60N 2/22 |
| WO | WO-2015187633 A1 | * | 12/2015 | ............. B64D 11/06 |
| WO | WO-2017021485 A1 | * | 2/2017 | ......... B60N 2/42709 |
| WO | WO-2019164540 A1 | * | 8/2019 | ........... B64D 11/064 |

* cited by examiner

*Primary Examiner* — Timothy J Brindley
(74) *Attorney, Agent, or Firm* — Kilpatrick Townsend & Stockton LLP

(57) ABSTRACT

Described are base frame assemblies for a passenger seat having an elongated tube and a connector. The elongated tube may include an inner surface, an outer surface, and a connecting aperture extending from the inner surface to the outer surface. The connector may include a first end, a second end, a central opening extending from the first end to the second end, a first stopper at the first end, a second stopper proximate to the second end, a contact surface between the first stopper and the second stopper, and an adjustment slot defined as extending from the first end to the second end. The connector may be positioned within the connecting aperture such that a portion of the elongated tube contacts the contact surface between the first stopper and the second stopper that may together overlap a portion of the inner surface and outer surface of the elongated tube.

20 Claims, 4 Drawing Sheets

CONNECTOR FOR A TUBE ASSEMBLY IN A PASSENGER SEAT

FIELD OF THE INVENTION

The field of the invention relates to passenger seats, and, more particularly, to base frame assemblies for passenger seats.

BACKGROUND

The cabin of a typical passenger aircraft is dominated by rows of seats for seating passengers. These seats are typically formed of a metal structure having attachment points for components which are fastened to the structure of the seat assembly. Typically the structure includes seat leg assemblies that attach to anchor points in the passenger cabin, tubular structural members, or base frame tubes, that connect to the seat posts and connect the seat posts in each row together, and spreaders which attach to the tubular structural members for providing attachment points for various other parts of the seats. The seat legs and spreaders are routinely connected with the tubular structural members by connectors (e.g. through-bolts or rivets) and/or via partial deformation of the seat legs and spreaders to tightly grip the tubular structural members.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a base frame assembly for a passenger seat includes an elongated tube and a connector. The elongated tube may include an inner surface, an outer surface, and a connecting aperture extending from the inner surface to the outer surface. The connector may include a first end, a second end, a central opening, a first stopper, a second stopper, a contact surface, and an adjustment slot. The central opening may extend from the first end to the second end. The first stopper may be at the first end. The second stopper may be proximate to the second end. The contact surface may be between the first stopper and the second stopper. The adjustment slot may extend at least partially from the first end to the second end. The connector may be positioned within the connecting aperture such that a portion of the elongated tube contacts the contact surface between the first stopper and the second stopper. The first stopper and the second stopper together may overlap a portion of the inner surface and a portion of the outer surface of the elongated tube.

In some embodiments, the first stopper may include a ledge extending outwards from the first end of the connector. In certain embodiments, the second stopper may include a plurality of ribs extending outwards from the connector between the first end and the second end of the connector.

In some embodiments, the connector may include a flexible material such that a dimension of the connector is adjustable via the adjustment slot. In certain embodiments, a diameter of the connector may be adjustable via the adjustment slot. In some embodiments, the flexible material may include a rubber or a plastic.

In some embodiments, the base frame assembly may include a fastener. The fastener may extend through the central opening of the connector. While the fastener extends through the central opening, the first stopper and the second stopper together may overlap the portion of the inner surface and the portion of the outer surface of the elongated tube. The fastener may secure a secondary frame component to the elongated tube. In certain embodiments, the base frame assembly may include the secondary frame component. The secondary frame component may include at least one of a spreader or a leg assembly.

In some embodiments, the elongated tube may be a first elongated tube. The connecting aperture may be a first connecting aperture. The base frame assembly may include a second elongated tube. The second elongated tube may include an inner surface, an outer surface, and a second connecting aperture. The second connecting aperture may extend from the inner surface to the outer surface of the second elongated tube. The second elongated tube may be within the first elongated tube such that the outer surface of the first elongated tube may be an outermost surface, the inner surface of the second elongated tube may be an innermost surface, and the first connecting aperture may be aligned with the second connecting aperture.

In certain embodiments, a length of the second elongated tube may be less than a length of the first elongated tube. In some embodiments, the connector may connect the first elongated tube with the second elongated tube without a rivet. In certain embodiments, a diameter of the central opening may be adjustable via the adjustment slot. In some embodiments, the base frame assembly may be a passenger seat assembly.

According to certain embodiments of the present invention, a base frame assembly for a passenger seat may include a tube and a connector. The tube may include an inner surface, an outer surface, and a connecting aperture. The connecting aperture may extend from the inner surface to the outer surface. The connector may include a first end, a second end, a first stopper, a second stopper, a central opening, and an adjustment slot. The first stopper may be at the first end. The second stopper may be proximate to the second end. The central opening may extend from the first end to the second end. The connector may receive a fastener within the central opening for connecting the tube with a secondary frame component. The adjustment slow may be defined to extend from the first end to the second end. A diameter of the central opening may be adjustable via the adjustment slot. The connector may be positioned within the at least one connecting aperture such that the first stopper and the second stopper together may overlap a portion of the tube.

In some embodiments, the base frame assembly may include the secondary frame component. The secondary frame component may include at least one of a spreader or a leg assembly. In certain embodiments, the first stopper may include a ledge extending outwards from the first end of the connector. The second stopper may include a plurality of ribs extending outwards from the connector between the first end and the second end of the connector.

In some embodiments, the tube may be a first tube. The connecting aperture may be a first connecting aperture. The base frame assembly may include a second tube. The second tube may include an inner surface, an outer surface, and a second connecting aperture. The second connecting aperture may extend from the inner surface to the outer surface of the second tube. The second tube may be within the first tube such that the outer surface of the first tube may be an outermost surface, the inner surface of the second tube may be an innermost surface, the first connecting aperture may be aligned with the second connecting aperture, and the connector may extend through the aligned first connecting aperture and second connecting aperture.

According to certain embodiments of the present invention, a base frame assembly for a passenger seat may include a tube assembly and a connector. The tube assembly may include a first tube and a second tube. The first tube may include an inner surface, an outer surface, and a first aperture. The first aperture may extend from the inner surface to the outer surface. The second tube may include an inner surface, an outer surface, and a second aperture. The second aperture may extend from the inner surface of the second tube to the outer surface of the second tube. The second tube may be within the first tube such that the outer surface of the first tube may be an outermost surface of the base frame tube assembly, the inner surface of the second tube may be an innermost surface of the base frame tube assembly, and the first aperture may be aligned with the second aperture. The connector may include a first end, a second end, a central opening, a first stopper, a second stopper, and a contact surface. The central opening may extend from the first end to the second end. The first stopper may be at the first end. The second stopper may be proximate the second end. The contact surface may be between the first stopper and the second stopper. The connector may be positioned within the aligned first and second apertures such that a portion of the first tube and the second tube may be retained between the first stopper and the second stopper.

In some embodiments, the first stopper may include a ledge extending outwards from the first end of the connector. The second stopper may include a plurality of ribs extending outwards from the connector between the first end and the second end of the connector. In some examples, the connector may connect the first tube with the second tube without a rivet.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide connectors for base frame assemblies for passenger seats. While the connectors are discussed for use with aircraft seats, they are by no means so limited. Rather, embodiments of the connectors for base frame assemblies may be used in passenger seats or other seats of any type or otherwise as desired.

Figure 1:
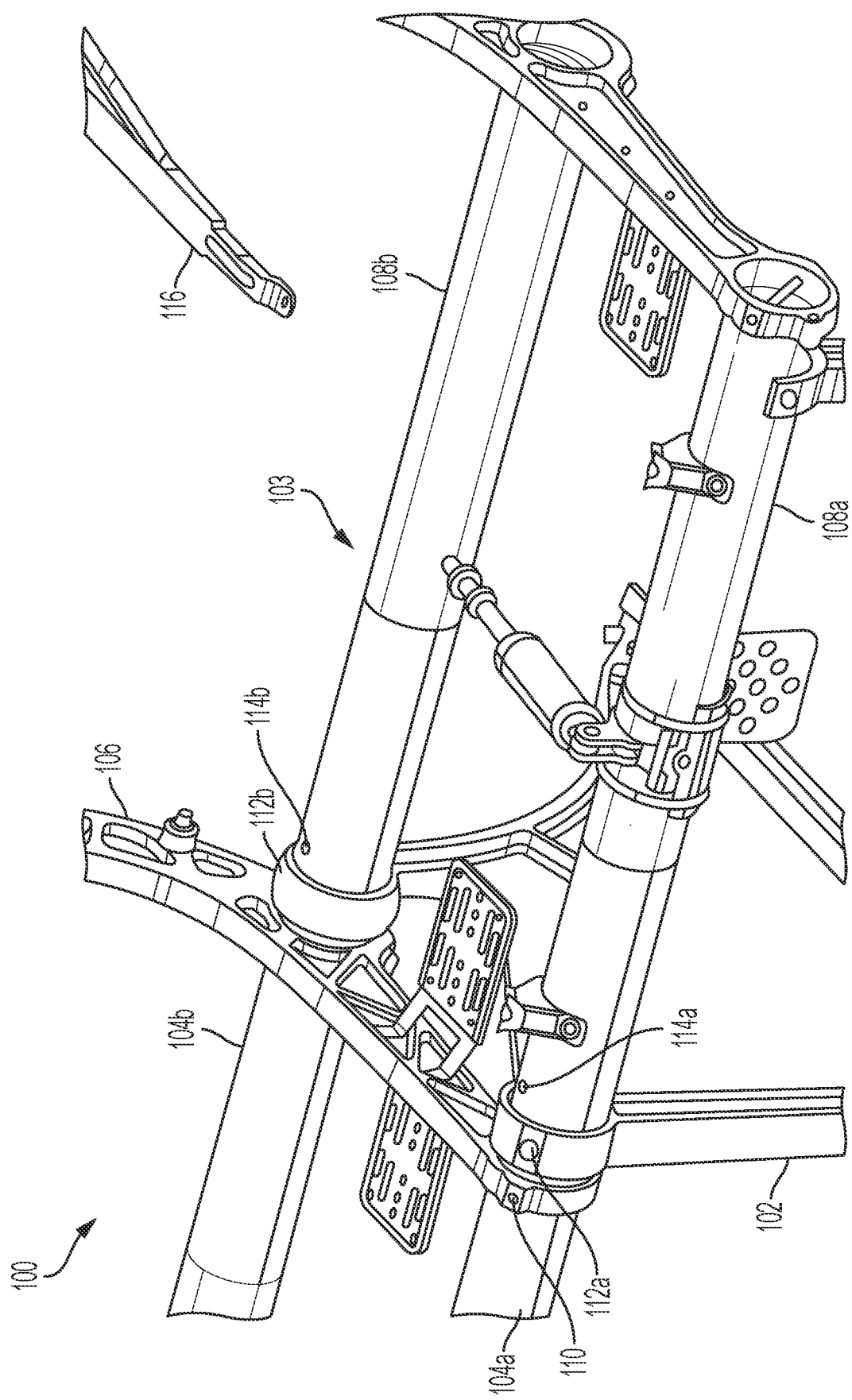
FIG. 1 is a perspective view of a base frame assembly of a generalized passenger seat, according to certain embodiments of the present invention.

FIG. 1 is a perspective view of a base frame assembly 100 of a generalized passenger seat according to certain embodiments of the present invention. The base frame assembly 100 may include a leg assembly 102, a base frame tube assembly 103, and a spreader 106, although the particular base frame assembly 100 illustrated should not be considered limiting, and in other embodiments the base frame assembly 100 may include additional or fewer components as desired. While not illustrated in FIG. 1, the base frame assembly 100 may support a seat back of the passenger seat.

The leg assembly 102 may mechanically affix or otherwise couple the passenger seat to a floor of a passenger vehicle such as an airplane or other suitable passenger vehicle. In certain embodiments, the tube assembly 103 may include at least one base frame tube 104a, and in certain embodiments, the base frame tube assembly 103 may include two or more base frame tubes 104a-b for connecting the leg assembly 102 and the spreader 106. Accordingly, while two base frame tubes 104a-b are illustrated, the base frame tube assembly 103 may include any number of base frame tubes 104 as desired, including a single base frame tube 104 or more than two base frame tubes 104. The base frame tubes may include uniform elongated tubes, non-uniform elongated tubes, or a combination thereof. Moreover, the particular base frame tubes 104 illustrated should not be considered limiting, and other portions of the base frame assembly 100 may include a base frame tube 104 as desired.

Optionally, the base frame tube assembly 103 may also include at least one doubler tube 108a, and in certain embodiments, the base frame tube assembly 103 may include two or more doubler tubes 108a-b. The doubler tubes 108a-b may include uniform elongated tubes, non-uniform elongated tubes, or a combination thereof. Doubler tubes 108a-b may be inserted into the base frame tubes 104a-b, respectively. In various embodiments, the doubler tubes 108a-b may optionally be used to provide areas of increased strength along the base frame tubes.

In some embodiments, the base frame tubes 104a-b may be coupled together via suitable fasteners, such as rivets 114a-b. The base frame tubes 104a-b may include connecting apertures that may align to allow for insertion of the rivets 114a-b into the connecting apertures. Other suitable fasteners may include but are not limited to screws, bolts, or other mechanical or chemical fasteners. The number, location, and size of the fasteners and/or apertures for receiving the fasteners should not be considered limiting.

In certain embodiments, the leg assembly 102 may include two or more apertures for receiving two or more base frame tubes such as the base frame tubes 104a-b and the doubler tubes 108a-b. The doubler tubes 108a-b may be positioned within the base frame tubes 104a-b. The base frame tubes 104a and 104b may be positioned within the two or more apertures, and may be mechanically coupled to the leg assembly 102 via suitable fasteners, such as bolts 112a-b. The base frame tubes and the leg assembly 102 may each include connecting apertures that may align to allow for insertion of the bolts 112a-b into the connecting apertures. Other suitable fasteners may include but are not limited to pins, rods, or other substantially cylindrical features that may be inserted into the connecting apertures.

In certain embodiments, the spreader 106 may include an arm rest 116 and two or more apertures for receiving two or more base frame tubes such as the base frame tubes 104a and 104b and the doubler tubes 108a and 108b. The doubler tubes 108a-b may be positioned within the base frame tubes 104a-b. The base frame tubes 104a and 104b may be positioned within the two or more apertures of the spreader 106, such that the spreader 106 is proximate to the leg assembly 102 when the base frame assembly 100 is assembled. The base frame tubes 104a and 104b may be mechanically coupled to the spreader 106 via suitable fasteners, such as a bolt 110. The base frame tubes and the spreader 106 may each include connecting apertures that may align to allow for insertion of the bolt 110 into the connecting apertures. Other suitable fasteners may include but are not limited to pins, rods, or other substantially cylindrical features that may be inserted into the connecting apertures. The number, location, and size of the fasteners and/or apertures for receiving the fasteners should not be considered limiting.

The portions or components of the base frame assembly 100 including the base frame tube assembly 103 may be constructed from various suitable materials as desired, including but not limited to, stainless steel, aramid fibers, polycarbonate, polypropylene, aluminum, aluminum alloys, magnesium, magnesium alloys, other metallic materials or non-metallic materials, composite materials, combinations thereof, or other suitable materials. In certain embodiments, at least one portion of the base frame assembly 100 including the base frame tube assembly 103 may optionally be constructed from a material that is different from the material used for another portion of the base frame assembly 100. As one non-limiting example, the leg assembly 102 may be constructed from aluminum or an aluminum alloy, and the base frame tube assembly 103 may be constructed from magnesium or a magnesium alloy. In other embodiments, the components of the base frame assembly 100 including the base frame tube assembly 103 may be constructed from the same material. In certain embodiments, the leg assembly 102 and the spreader 106 may include the same or similar material, such as an aluminum alloy, and the base frame tube assembly 103 may include another material, such as the magnesium alloy, that is different from the material of the leg assembly 102 and the spreader 106.

Figure 2:
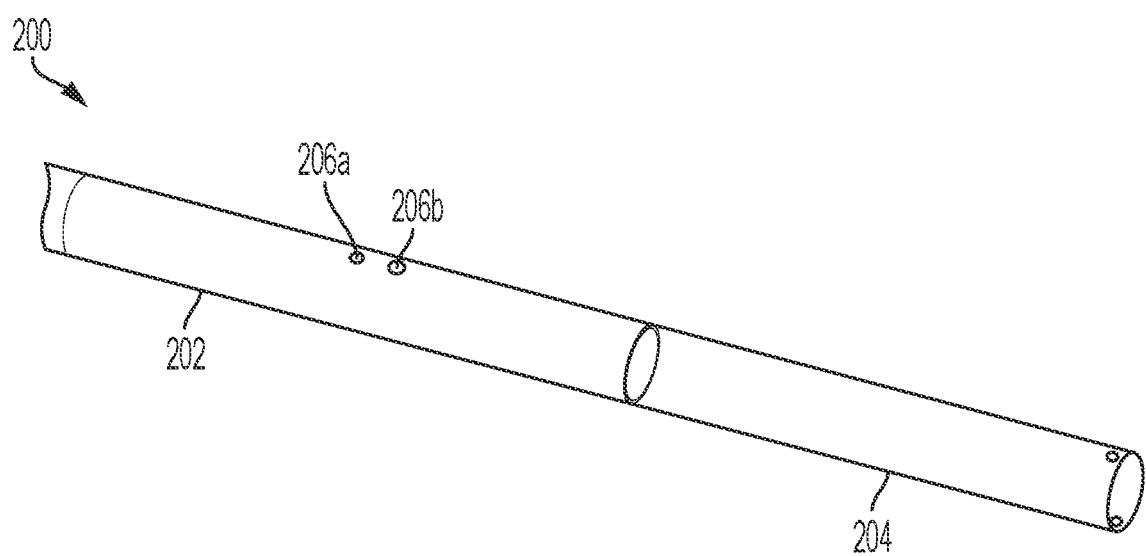
FIG. 2 is a perspective view of a tube assembly of the base frame assembly of FIG. 1.
Figure 3:
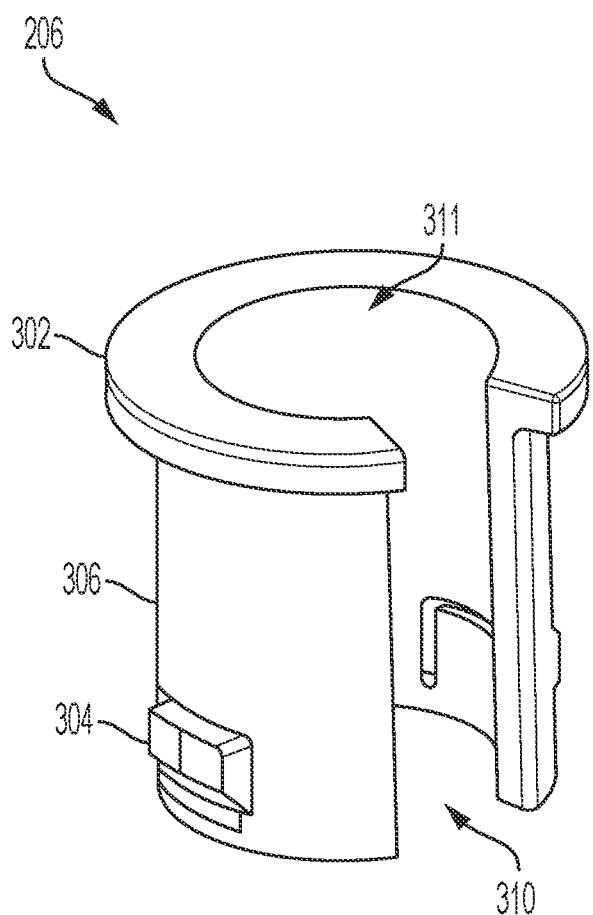
FIG. 3 is a connector of the base frame tube assembly of FIG. 2.
Figure 4:
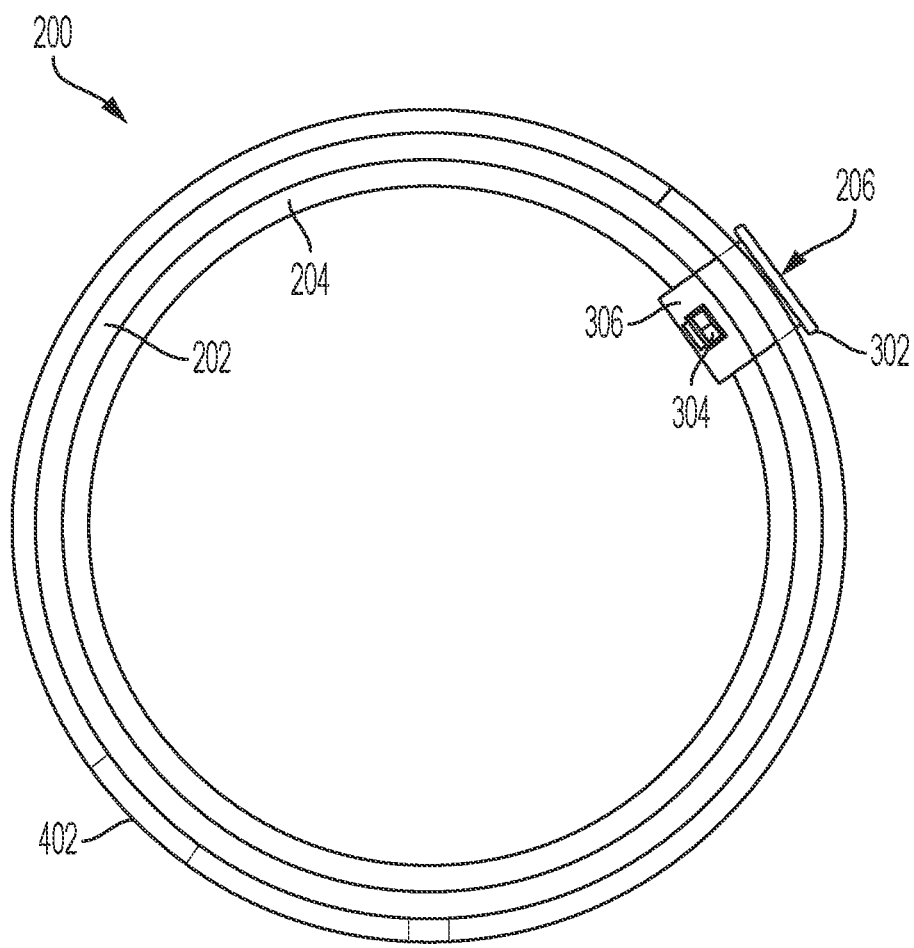
FIG. 4 is a side view of the base frame tube assembly of FIG. 2.

FIGS. 2-4 illustrate a tube assembly 200 according to various components. In some examples, the base frame tube assembly 200 of FIG. 2 may be utilized in the generalized passenger seat. Similar to the base frame tube assembly 103, the base frame tube assembly 200 may connect the leg assembly 102 and the spreader 106. Compared to the base frame tube assembly 103, the base frame tube assembly 200 may use a connector 206 for connecting base frame tubes together without the use of rivets 114a-b. The tube assembly 200 may also use the connector 206 for securing the base frame tubes to secondary frame components, thereby connecting and securing the base frame tubes together.

The base frame tubes of the base frame tube assembly 200 may include a first tube 202 and a second tube 204 inserted within the first tube 202. In certain embodiments, the base frame tubes may be elongated tubes. The first tube 202 and the second tube may each include inner surfaces and outer surfaces. The first tube 202 may include a first aperture and the second tube 204 may include a second aperture. In some embodiments, the first aperture and the second aperture may be connecting apertures. The second tube 204 may be inserted within the first tube 202 such that the first aperture and the second aperture align, the outer surface of the first tube 202 is an outermost surface, and the inner surface of the second tube 204 is an innermost surface. A connector 206 may be inserted within the aligned apertures for securing the base frame tubes. In some embodiments, the base frame tubes may be inserted within a secondary frame component. Examples of the secondary frame component may include leg assemblies or spreaders. The connector 206 may be inserted through the secondary frame component and the aligned apertures. In some embodiments, the base frame tube assembly 200 may include additional base frame tubes that may be inserted within the first tube 202 or the second tube 204. Each base frame tube in the base frame tube assembly 200 may include multiple apertures that may each align with corresponding apertures in the other base frame tubes. Each set of aligned apertures may be aligned within a secondary frame component to be connected with at least one connector 206.

In some embodiments, and as illustrated in FIG. 2, the first tube 202 and the second tube 204 may be connected via connectors 206a and 206b inserted into two aligned apertures. The first tube 202 and the second tube 204 may be inserted within the leg assembly 102 and the spreader 106 illustrated in FIG. 1. Compared to the base frame tube assembly 103, the base frame tube assembly 200 may be connected with the connector 206a being inserted into the leg assembly 102 and the first aligned apertures of the first tube 202 and the second tube 204. Likewise, the base frame tube assembly 200 may be connected with the connector 206b being inserted into the spreader 106 and the second aligned apertures of the first tube 202 and the second tube 204. In some embodiments, a length of the second tube 204 may be less than a length of the first tube 202.

According to certain embodiments of the present invention, as shown in FIG. 3, each connector 206 may include a first stopper 302, a second stopper 304, a contact surface 306, a central opening 311, and an adjustment slot 310. The first stopper 302 may be positioned at a first end of the connector 206, and may be a ledge extending outwards from the first end of the connector 206. The contact surface 306 may extend between the first stopper 302 and the second stopper 304. The second stopper 304 may be positioned on the contact surface 306 proximate to a second end of the connector 206, and may include a plurality of ribs extending outwards from the connector 206 between the first end and the second end of the connector 206. The adjustment slot 310 may be a slot in the connector 206 defined as extending between the first stopper 302 and the second stopper 304. The connector 206 may also include the central opening 311 extending from the first end to the second end of the connector 206. As discussed in detail below, a fastener may extend through the central opening 311 when the connector 206 is assembled with a base frame tube.

In some embodiments, the connector 206 may be constructed from a flexible material, including but not limited to a rubber or a plastic. The flexible material may allow a diameter of the connector 206 to be adjustable via the adjustment slot 310. For example, edges of the connector 206 defining the adjustment slot 310 may be moved towards one another, thus restricting the diameter of the connector

206. Restricting or otherwise adjusting the diameter of the connector 206 may restrict or adjust a diameter of the central opening. Because the diameter of the connector 206 may be adjusted, the connector 206 may be positioned in apertures with a range of diameters.

When assembled with the base frame tubes, the connector 206 may be positioned within an aperture of a single base frame tube, or within aligned apertures of multiple base frame tubes and/or doublers. In some embodiments, positioning the connector 206 within an aperture may involve a portion of a base frame tube contacting the contact surface of the connector 206. The first stopper 302 may overlap a portion of an outer surface of a base frame tube, and the second stopper 304 may overlap a portion of an inner surface of the base frame tube, thus securing the connector 206 in place. In certain embodiments, positioning the connector within aligned apertures of a base frame tube including one or more inserted base frame tubes may involve the first stopper 302 overlapping a portion of an outermost surface of the base frame tubes, and the second stopper 304 overlapping a portion of an innermost surface of the base frame tubes, thus securing the base frame tubes together with the connector 206.

According to certain embodiments of the present invention, as shown in FIG. 4, a side view of the base frame tube assembly 200 may include a connector 206 inserted within aligned apertures of a secondary frame component 402, a first tube 202, and a second tube 204. The second tube 204 may be inserted within the first tube 202, and the first tube 202 may be inserted within the secondary frame component 402. The first stopper 302 of the connector 206 may overlap a portion of the outermost surface of the secondary frame component 402, and the second stopper 304 may overlap a portion of the innermost surface of the second tube 204. An inner portion of each of the aligned apertures of the secondary frame component 402, the first tube 202, and the second tube 204 may contact the contact surface 306 of the connector 206.

In some embodiments, a suitable fastener (not pictured) may extend through the central opening 311 of the connector 206 to connect the first tube 202 and the second tube 204 to the secondary frame component 402. The fastener may be a bolt having a diameter such that, when extended through the central opening 311 of the connector 206, the fastener may optionally increase the diameter of the central opening 311 of the connector 206. Increasing the diameter of the connector 206 may tighten the fit of the connector 206 within the aligned apertures. Other suitable fasteners may include but are not limited to pins, rods, or other substantially cylindrical features that may be inserted into the connector 206. In other embodiments, the fastener need not expand the connector 206.

In some embodiments, a base frame assembly 100 including the base frame tube assembly 200 may withstand at least a 16 G dynamic loading event, such as a sudden acceleration of one of the components. Compared to the base frame tube assembly 103 that includes rivets 114a-b that may cause stress risers in the base frame tubes, the base frame tube assembly 200 may have reduced stress in the base frame tubes. The tube assembly may be assembled more quickly or easily, as additional apertures may not need to be created for connecting the base frame tubes to each other. In some examples, the connector 206 being a flexible material such as a rubber or a plastic rather than a metal material may provide a greater protection against galvanic corrosion. The flexible material of the connector 206 may accommodate multiple base frame tubes and thickness ranges of base frame tubes.

In the following, further examples are described to facilitate the understanding of the invention:

Example 1. A base frame assembly for a passenger seat, the base frame assembly comprising: an elongated tube comprising an inner surface, an outer surface, and a connecting aperture extending from the inner surface to the outer surface; and a connector comprising: a first end; a second end; a central opening extending from the first end to the second end; a first stopper at the first end; a second stopper proximate to the second end; a contact surface between the first stopper and the second stopper; and an adjustment slot defined extending from the first end to the second end, wherein the connector is positioned within the connecting aperture such that a portion of the elongated tube contacts the contact surface between the first stopper and the second stopper, and the first stopper and the second stopper together overlap a portion of the inner surface and a portion of the outer surface of the elongated tube.

Example 2. The base frame assembly of any of the preceding or subsequent examples or combinations of examples, wherein the first stopper comprises a ledge extending outwards from the first end of the connector.

Example 3. The base frame assembly of any of the preceding or subsequent examples or combinations of examples, wherein the second stopper comprises a plurality of ribs extending outwards from the connector between the first end and the second end of the connector.

Example 4. The base frame assembly of any of the preceding or subsequent examples or combinations of examples, wherein the connector comprises a flexible material such that a dimension of the connector is adjustable via the adjustment slot.

Example 5. The base frame assembly of any of the preceding or subsequent examples or combinations of examples, wherein a diameter of the connector is adjustable via the adjustment slot.

Example 6. The base frame assembly of any of the preceding or subsequent examples or combinations of examples, wherein the flexible material comprises a rubber or a plastic.

Example 7. The base frame assembly of any of the preceding or subsequent examples or combinations of examples, further comprising a fastener extending through the central opening of the connector while the first stopper and the second stopper together overlap the portion of the inner surface and the portion of the outer surface of the elongated tube, wherein the fastener is configured to secure a secondary frame component to the elongated tube.

Example 8. The base frame assembly of any of the preceding or subsequent examples or combinations of examples, further comprising the secondary frame component, and wherein the secondary frame component comprises at least one of a spreader or a leg assembly.

Example 9. The base frame assembly of any of the preceding or subsequent examples or combinations of examples, wherein the elongated tube is a first elongated tube and the connecting aperture is a first connecting aperture, and wherein the base frame assembly further comprises a second elongated tube comprising an inner surface, an outer surface, and a second connecting aperture extending from the inner surface to the outer surface of the second elongated tube, wherein the second elongated tube is within the first elongated tube such that the outer surface of the first elongated tube is an outermost surface, the inner surface of the second elongated tube is an innermost surface, and the first connecting aperture is aligned with the second connecting aperture.

Example 10. The base frame assembly of any of the preceding or subsequent examples or combinations of examples, wherein a length of the second elongated tube is less than a length of the first elongated tube.

Example 11. The base frame assembly of any of the preceding or subsequent examples or combinations of examples, wherein the connector connects the first elongated tube with the second elongated tube without a rivet.

Example 12. The base frame assembly of any of the preceding or subsequent examples or combinations of examples, wherein a diameter of the central opening is adjustable via the adjustment slot.

Example 13. A passenger seat assembly comprising the base frame assembly of any of the preceding or subsequent examples or combination of examples.

Example 14. A base frame assembly for a passenger seat, the base frame assembly comprising: a tube comprising an inner surface, an outer surface, and a connecting aperture extending from the inner surface to the outer surface; and a connector comprising: a first end; a second end; a first stopper at the first end; a second stopper proximate to the second end; a central opening extending from the first end to the second end, wherein the connector is configured to receive a fastener within the central opening for connecting the tube with a secondary frame component; and an adjustment slot defined extending from the first end to the second end, wherein a diameter of the central opening is adjustable via the adjustment slot, wherein the connector is positioned within the at least one connecting aperture such that the first stopper and the second stopper together overlap a portion of the tube.

Example 15. The base frame assembly of any of the preceding or subsequent examples or combinations of examples, further comprising the secondary frame component, and wherein the secondary frame component comprises at least one of a spreader or a leg assembly.

Example 16. The base frame assembly of any of the preceding or subsequent examples or combinations of examples, wherein the first stopper comprises a ledge extending outwards from the first end of the connector, and wherein the second stopper comprises a plurality of ribs extending outwards from the connector between the first end and the second end of the connector.

Example 17. The base frame assembly of any of the preceding or subsequent examples or combinations of examples, wherein the tube is a first tube and the connecting aperture is a first connecting aperture, and wherein the base frame assembly further comprises a second tube comprising an inner surface, an outer surface, and a second connecting aperture extending from the inner surface to the outer surface of the second tube, wherein the second tube is within the first tube such that the outer surface of the first tube is an outermost surface, the inner surface of the second tube is an innermost surface, the first connecting aperture is aligned with the second connecting aperture, and the connector extends through the aligned first connecting aperture and second connecting aperture.

Example 18. A base frame assembly for a passenger seat, the base frame assembly comprising: a tube assembly comprising: a first tube comprising an inner surface, an outer surface, and a first aperture extending from the inner surface to the outer surface; a second tube comprising an inner surface, an outer surface, and a second aperture extending from the inner surface of the second tube to the outer surface of the second tube, wherein the second tube is within the first tube such that the outer surface of the first tube is an outermost surface of the base frame tube assembly, the inner surface of the second tube is an innermost surface of the base frame tube assembly, and the first aperture is aligned with the second aperture; and a connector comprising: a first end; a second end; a central opening extending from the first end to the second end; a first stopper at the first end; a second stopper proximate to the second end; a contact surface between the first stopper and the second stopper; and wherein the connector is positioned within the aligned first and second apertures such that a portion of the first tube and the second tube is retained between the first stopper and the second stopper.

Example 19. The base frame assembly of any of the preceding or subsequent examples or combinations of examples, wherein the first stopper comprises a ledge extending outwards from the first end of the connector, and wherein the second stopper comprises a plurality of ribs extending outwards from the connector between the first end and the second end of the connector.

Example 20. The base frame assembly of any of the preceding or subsequent examples or combinations of examples, wherein the connector connects the first tube with the second tube without a rivet.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A base frame assembly for a passenger seat, the base frame assembly comprising:
   an elongated tube comprising an inner surface, an outer surface, and a connecting aperture extending from the inner surface to the outer surface; and
   a connector comprising:
      a first end;
      a second end;
      a central opening extending from the first end to the second end;
      a first stopper at the first end;
      a second stopper proximate to the second end;
      a contact surface between the first stopper and the second stopper; and
      an adjustment slot defined extending from the first end to the second end,
   wherein the connector is positioned within the connecting aperture such that a portion of the elongated tube contacts the contact surface between the first stopper and the second stopper, and the first stopper and the second stopper together overlap a portion of the inner surface and a portion of the outer surface of the elongated tube.

2. The base frame assembly of claim 1, wherein the first stopper comprises a ledge extending outwards from the first end of the connector.

3. The base frame assembly of claim 1, wherein the second stopper comprises a plurality of ribs extending outwards from the connector between the first end and the second end of the connector.

4. The base frame assembly of claim 1, wherein the connector comprises a flexible material such that a dimension of the connector is adjustable via the adjustment slot.

5. The base frame assembly of claim 4, wherein a diameter of the connector is adjustable via the adjustment slot.

6. The base frame assembly of claim 4, wherein the flexible material comprises a rubber or a plastic.

7. The base frame assembly of claim 1, further comprising a fastener extending through the central opening of the connector while the first stopper and the second stopper together overlap the portion of the inner surface and the portion of the outer surface of the elongated tube, wherein the fastener is configured to secure a secondary frame component to the elongated tube.

8. The base frame assembly of claim 7, further comprising the secondary frame component, and wherein the secondary frame component comprises at least one of a spreader or a leg assembly.

9. The base frame assembly of claim 1, wherein the elongated tube is a first elongated tube and the connecting aperture is a first connecting aperture, and wherein the base frame assembly further comprises a second elongated tube comprising an inner surface, an outer surface, and a second connecting aperture extending from the inner surface to the outer surface of the second elongated tube, wherein the second elongated tube is within the first elongated tube such that the outer surface of the first elongated tube is an outermost surface, the inner surface of the second elongated tube is an innermost surface, and the first connecting aperture is aligned with the second connecting aperture.

10. The base frame assembly of claim 9, wherein a length of the second elongated tube is less than a length of the first elongated tube.

11. The base frame assembly of claim 9, wherein the connector connects the first elongated tube with the second elongated tube without a rivet.

12. The base frame assembly of claim 1, wherein a diameter of the central opening is adjustable via the adjustment slot.

13. A passenger seat assembly comprising the base frame assembly of claim 1.

14. A base frame assembly for a passenger seat, the base frame assembly comprising:
  a tube comprising an inner surface, an outer surface, and a connecting aperture extending from the inner surface to the outer surface; and
  a connector comprising:
    a first end;
    a second end;
    a first stopper at the first end;
    a second stopper proximate to the second end;
    a central opening extending from the first end to the second end, wherein the connector is configured to receive a fastener within the central opening for connecting the tube with a secondary frame component; and
    an adjustment slot defined extending from the first end to the second end, wherein a diameter of the central opening is adjustable via the adjustment slot,
  wherein the connector is positioned within the at least one connecting aperture such that the first stopper and the second stopper together overlap a portion of the tube.

15. The base frame assembly of claim 14, further comprising the secondary frame component, and wherein the secondary frame component comprises at least one of a spreader or a leg assembly.

16. The base frame assembly of claim 14, wherein the first stopper comprises a ledge extending outwards from the first end of the connector, and wherein the second stopper comprises a plurality of ribs extending outwards from the connector between the first end and the second end of the connector.

17. The base frame assembly of claim 14, wherein the tube is a first tube and the connecting aperture is a first connecting aperture, and wherein the base frame assembly further comprises a second tube comprising an inner surface, an outer surface, and a second connecting aperture extending from the inner surface to the outer surface of the second tube, wherein the second tube is within the first tube such that the outer surface of the first tube is an outermost surface, the inner surface of the second tube is an innermost surface, the first connecting aperture is aligned with the second connecting aperture, and the connector extends through the aligned first connecting aperture and second connecting aperture.

18. A base frame assembly for a passenger seat, the base frame assembly comprising:
  a tube assembly comprising:
    a first tube comprising an inner surface, an outer surface, and a first aperture extending from the inner surface to the outer surface;
    a second tube comprising an inner surface, an outer surface, and a second aperture extending from the inner surface of the second tube to the outer surface of the second tube, wherein the second tube is within the first tube such that the outer surface of the first tube is an outermost surface of the base frame tube assembly, the inner surface of the second tube is an innermost surface of the base frame tube assembly, and the first aperture is aligned with the second aperture; and
  a connector comprising:
    a first end;
    a second end;
    a central opening extending from the first end to the second end;
    a first stopper at the first end;
    a second stopper proximate to the second end;
    a contact surface between the first stopper and the second stopper; and
  wherein the connector is positioned within the aligned first and second apertures such that a portion of the first tube and the second tube is retained between the first stopper and the second stopper.

19. The base frame assembly of claim 18, wherein the first stopper comprises a ledge extending outwards from the first end of the connector, and wherein the second stopper comprises a plurality of ribs extending outwards from the connector between the first end and the second end of the connector.

20. The base frame assembly of claim 18, wherein the connector connects the first tube with the second tube without a rivet.

* * * * *